United States Patent
Evans

(10) Patent No.: US 6,497,198 B2
(45) Date of Patent: Dec. 24, 2002

(54) ANIMAL COLLAR WITH INTEGRAL IDENTIFICATION HOLDERS

(76) Inventor: Richard Evans, 184 Bay Rd., Bowdoinham, ME (US) 04008

( * ) Notice: Subject to any disclaimer, the term of this patent is extended or adjusted under 35 U.S.C. 154(b) by 10 days.

(21) Appl. No.: 09/754,700

(22) Filed: Jan. 3, 2001

(65) Prior Publication Data

US 2002/0083902 A1 Jul. 4, 2002

(51) Int. Cl.$^7$ .............................................. A01K 27/00
(52) U.S. Cl. ........................................ 119/858; 40/303
(58) Field of Search .................... 119/858, 864, 119/865, 863, 792, 795, 907, 856; 40/665, 300, 303; 2/311

(56) References Cited

U.S. PATENT DOCUMENTS 1,539,744 A    5/1925  Kelly
4,178,879 A  * 12/1979  Cunningham ................ 119/106
5,467,743 A  * 11/1995  Doose .......................... 119/864
5,503,114 A  *  4/1996  Castagna ....................... 119/858

* cited by examiner

Primary Examiner—Charles T. Jordan
Assistant Examiner—Susan C Alimenti
(74) Attorney, Agent, or Firm—Patricia M. Mathers; Thomas L. Bohan

(57) ABSTRACT

A collar for animals which serves the function of holding identification tags or medallions in place. The collar holds the tags in a manner that is integral to the structure of the collar, in an orientation such that the tags are easily visible and readable, and in such a way that the tags will not strike one another, thereby reducing noise produced when the animal moves and decreasing the risk of the tags catching on exterior surfaces.

6 Claims, 3 Drawing Sheets

ANIMAL COLLAR WITH INTEGRAL
IDENTIFICATION HOLDERS

BACKGROUND OF THE INVENTION

1. Field of Invention

The present invention relates to collars for animals, mostly dogs, but any such animal collar to which it is customary to attach various tags and medallions. More particularly, the invention relates to the means of attaching such tags and medallions to the collar.

2. Description of Prior Art

Numerous types of collars for pets and livestock are known. They all have, however, disadvantages in that they either cannot accommodate various types and sizes of identification tags and/or securely hold the tags in such a way that they are readily accessible for reading.

The most common attempts to resolve these disadvantages include collars that have a band that runs through a metal ring or have a metal ring suspended from the band. The identification tags are then attached to this ring, usually by means of an S-hook or spring-clip. This configuration also has disadvantages in that the identification tags tend to hang on the underside of the animal's neck, thereby making them difficult to access for reading. Another disadvantage of this configuration is that since the tags are hanging loose from the collar, and since the tags and hardware for attaching them to the collar are most often made of metal, they typically cause a jingling noise when the animal moves. The noise caused by the animal's movement can be annoying or even detrimental, as in the case of dogs used for hunting in situations where stealth is desired. In addition, when the tags are in a hanging position, they can be pulled loose when they become caught in foliage or the wires of kennel cages and fences. Even worse, if the tag is not pulled loose in such a situation, the result can be injury or death to the animal.

A commonly available alternative to the previously referenced configuration is a metal identification plate that is permanently affixed to the collar band by means of rivets, staples, etc. While this configuration does offer the possibility of reducing noise and permitting visibility of the tag, it has two distinct disadvantages. The first is that this configuration can only be used with identification plates that are manufactured for this specific purpose. This factor eliminates the use of municipal identification of vaccination tags that are most often designed to be affixed to the collar in the traditional "hanging" configuration. The second disadvantage is that once the identification plate is affixed to the collar, it is in place permanently. The only way to replace such an identification plate would be through the destruction of the plate. Again, this configuration is not desirable for use with tags that must be replaced on a regular basis, such as the above-mentioned municipal tags.

Another technique, described by Cunningham (U.S. Pat. No. 4,178,879), makes use of a transparent window integral to the collar band which permits the insertion of an identification strip. As with the above-referenced prior art, this configuration is not well suited to use with common municipal animal identification tags, as it is designed to be used with a flexible, custom-made plastic strip to be displayed in the collar window.

Kelly (U.S. Pat. No. 1,539,744), teaches the attachment of common animal identification tags to a collar in such a way that they are readily visible and will not make noise when the animal moves. The disadvantage of Kelly is that it consists of a housing for each individual tag, a housing that is independent of the collar itself. In order to change the tag, the collar must be unbuckled and removed from the animal, the tag housing must be removed from the collar, and the housing must be disassembled. In addition to the inconvenience of this procedure, this invention also has the disadvantage of bulkiness that could make it difficult to use with more than one identification tag, as each tag would necessitate a separate housing.

What is needed, therefore, is a collar that will securely hold a plurality of tags in a manner that will allow the tags to be easily read and also prevent the tags from contacting each other in such a way as to cause a jingling noise when the collar wearer moves. What is further needed is such a collar that will accommodate tags and medallions of various sizes and shapes and provide easy attachment and removal of the tags without having to remove the collar from the animal.

SUMMARY OF THE INVENTION

For the above reasons, it is an object of the present invention to provide a collar that securely holds tags, in a variety of shapes and sizes, in a way that prevents the tags from contacting each other so as to cause a jingling noise. It is a further object of the invention to provide such a collar that will readily present the tags for easy reading. It is a yet further object to provide such a collar that provides easy attachment and removal of the tags without having to remove the collar from the animal.

The objects of the invention are achieved by providing a collar according to the present invention that permits tags and medallions to be attached to it in such a way that they are securely contained within the body of the collar. The collar band is made of two layers of material, an inner layer and an outer layer, stitched together to provide a means of affixing the tags between the layers such that the tags are secured in place, yet are readily visible and removable. A portion of the collar features an opening provided in the two stitched-together layers, which permits the insertion and removal of tags. The opening is closable by means of a conventional hook-and-loop type fastener material such as VELCRO that lines the inside surface of each layer. Thus, the two layers of material can be easily re-opened to permit removal or addition of tags.

PREFERRED EMBODIMENT OF THE INVENTION

Figure 1:
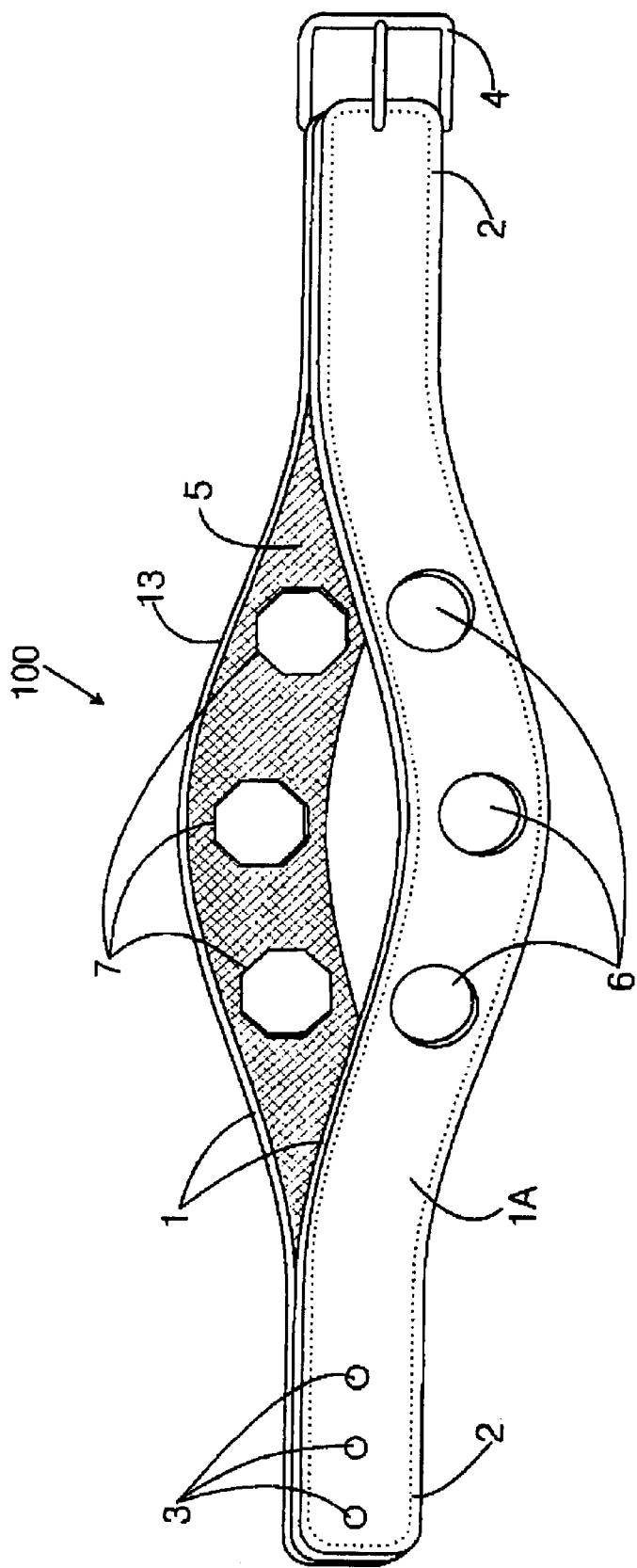
FIG. 1 is a perspective view of the preferred embodiment of the collar according to the invention.

FIG. 1 shows the preferred embodiment of a collar 100 according to the present invention. The collar 100 comprises a band made of an outer layer 1A and an inner layer 1B. The inner layer 1B and the outer layer 1A can be made of any durable, yet flexible material, such as, but not limited to, woven nylon, leather, canvas, or some other durable, yet flexible material. The outer and inner layers 1A, 1B are abutted back to back and stitched together at joinder sections 2 in a manner such that the layers at a central portion 13 of the collar band remain separable. The inner surfaces of the outer and inner layers 1A, 1B, are lined with a hook-and-loop fastener material 5. For example, the inner surface of one of the outer and inner layers 1A, 1B is lined with the "hook" portion of the hook-and-loop fastener material 5, while the other layer is lined with the "loop" portion. Preferably, adhesive-backed hook-and-loop fastener is used, but such fastener material 5 can also be stitched or affixed by other means to the collar 100.

The outer layer 1A of the collar features a plurality of punched-out sections 6 along the central portion 13 of the collar 100. Adjustment holes 3, punched through both the outer and inner layers 1A, 1B of the stitched-together joiner section 2 of the collar band, are provided at one end of the collar 100, and a buckle 4 at the other end. The adjustment holes 3 permit adjustment of the effective diameter of the collar 100 when it is secured around an animal's neck by means of the buckle 4.

As is shown in FIG. 1, the central portion 13 of the collar 100 can be opened by pulling the outer and inner layers 1A, 1B apart. Tags and medallions 7 can be placed against the inner surface of the inner layer 1B, arranged so as to be visible through a respective one of the punched-out sections 6 provided in the outer layer 1A. The number of tags and medallions 7 that can be arranged in the collar 100 so as to be visible and readable by an animal owner or handler is, of course, limited by the number of the punched-out sections 6 on the outer layer 1A.

To facilitate the insertion and removal of tags 7, the outer and inner layers 1A, 1B are separable, i.e., the collar 100 can be pulled apart at the central portion 13, as shown in FIG. 1. One or more of the tags 7 to be arranged in the collar 100 are then arranged along the inner surface of the inner layer 1B, so that each one of the respective tags 7 is arranged directly opposite one of the punched-out sections 6. When the tags 7 are in place, the outer and inner layers 1A, 1B are pressed firmly together so as to engage the hooks and loops of the fastener material 5. The result of this operation is that each of the tags 7 is held firmly in place up against one of the punched-out sections 6 so that the printed face of each of the respective tags 7 is readily visible to an animal owner or handler, yet securely fixed in position within the collar 100.

Figure 2:
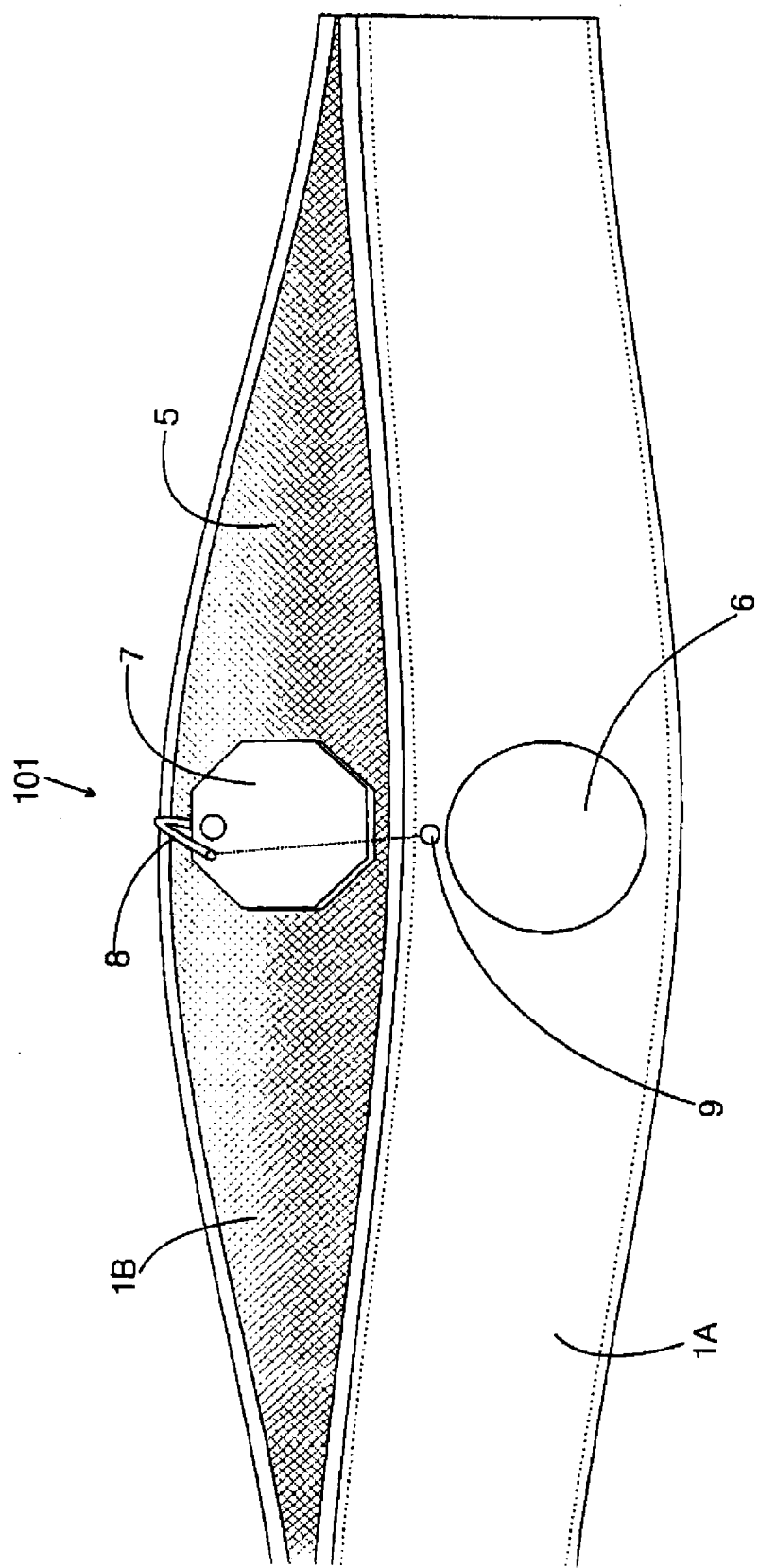
FIG. 2 is a partial perspective view of a first alternative embodiment of the collar according to the invention.

FIG. 2 shows a first alternative embodiment of a collar 101 according to the present invention. The collar 101 is identical to the preferred embodiment shown in FIG. 1, with the exception that tags 7A are fitted with a metal retaining post 8. A small hole 9 is provided directly above each one of the punched-out sections 6 in the outer layer 1A of the collar 101. This hole 9 is of sufficient diameter to receive the retaining post 8. In the process of pressing the two layers 1A, 1B together to secure the tags 7 in place within the collar 100, the retaining post 8 of each respective one of the tags 7A extends into the small hole 9 above the respective punched-out section 6. Once the outer and inner layers 1A, 1B have been fastened together by means of the hook-and-loop fastener 5, the free end of each retaining post 8 that projects outward through the outer layer 1A is bent downward toward the body of the collar 101 to further secure the tag 7A in place.

Figure 3:
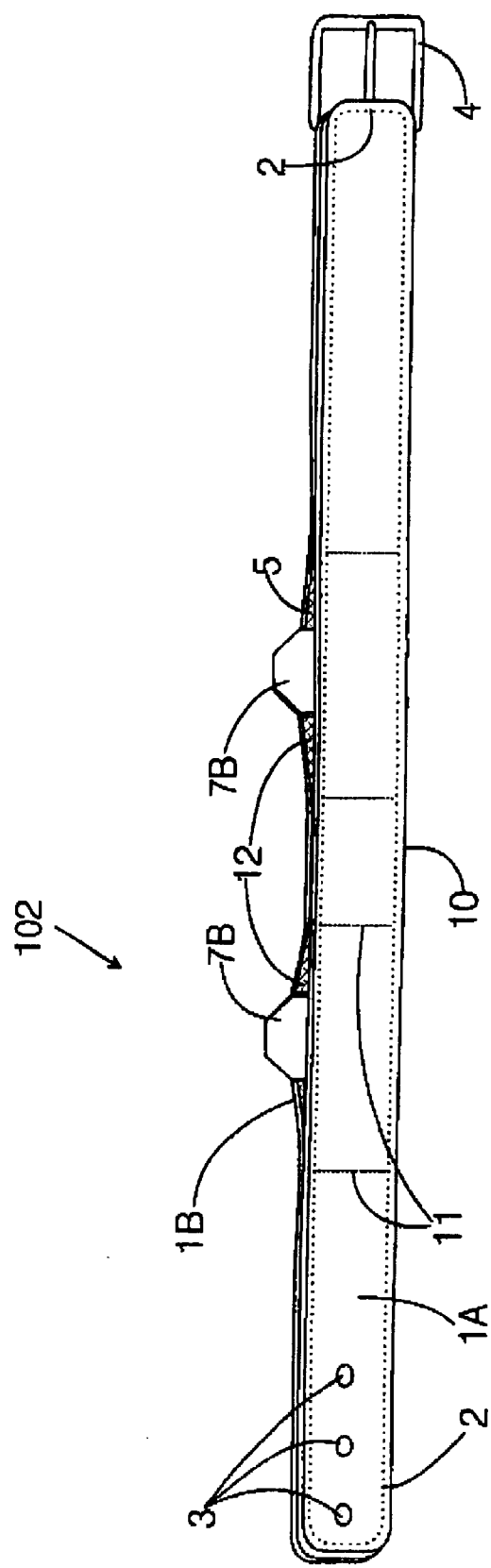
FIG. 3 is a perspective view of a second alternative embodiment of the collar according to the invention.

FIG. 3 shows a second alternative embodiment of a collar 102 according to the present invention. The collar 102 is similar to the preferred embodiment, collar 100, and to the first alternative embodiment, collar 101, with the exception that the outer and inner layers 1A, 1B of the collar 102 are stitched together at joinder sections 2 at either end of the collar 102, as well as along a bottom seam 10. The collar 102 also bears additional lateral sections of stitching 11 so that the length of the collar 102 is divided into a plurality of pockets 12 opening on one side of the collar 102. As with the other embodiments, the outer and inner layers 1A, 1B are lined with a hook-and-loop type fastener material 5. In this second alternative embodiment, tags 7B are backed with a layer of adhesive-backed hook-and-loop fastener material 5, depending upon which portion of the hook-and-loop fastener material 5 is used on the inner layer 1B of the collar 102. In order to affix the tags 7B to the collar 102, each of the tags 7 is inserted into one of the pockets 12, each pocket of which is sufficiently deep to hold two-thirds of the tag 7B, while the remaining portion protrudes beyond the edge of the collar 102. The tag 7B is pressed firmly against the outer layer 1A of the collar 102 so that the respective hook and loop surfaces of the tag 7B and the inner layer 1B of the collar 102 interlock and secure the tag 7B. Each tag 7B may be further secured in place with the addition of a metal or plastic retaining post, as described in the first alternative embodiment.

The embodiments mentioned herein are merely illustrative of the present invention. It should be understood that variations in construction of the present invention may be contemplated in view of the following claims without straying from the intended scope and field of the invention herein disclosed.

What is claimed is:

1. A collar adapted for carrying one or more tags, said collar comprising
   a collar band having a first end and a second end, an upper edge and a lower edge, an outer layer and an inner layer, and a central portion between said first end and said second end; and
   a plurality of viewing sections cut through said outer layer of said collar band in said central portion, each one of said viewing sections providing a viewing area for a respective one of said one or more tags;
   wherein said outer layer and said inner layer are joined together at said first end and said second end and along said lower edge, wherein said central portion remains open along said upper edge, and wherein said outer layer and said inner layer are each lined with a respectively mating hook-and-loop type fastener material, so that said outer layer and said inner layer, when pulled apart, provide an opening in said central portion in which said one or more tags are receivable such that each one of said one or more tags is viewable through a respective viewing section, and when pressed together, are fixedly secured to each other.

2. The collar of claim 1, wherein at least one tag of said one or more tags is provided with a retainer pin that projects forward toward said outer layer when said at least one tag is placed between said outer layer and said inner layer in a respective viewing section, and wherein a retainer-pin hole is provided in said outer layer of said collar band such that said retainer pin of said at least one tag is receivable in said retainer-pin hole.

3. A collar comprising a collar band having a first end and a second end, a central portion between said first end and said second end, an upper edge and a lower edge, and an outer layer and an inner layer, and
   one or more tags, and
   a plurality of viewing sections cut through said outer layer of said collar band in said central portion, each one of said viewing sections providing a viewing area for a respective one of said tags;

wherein said collar band is joined together at said first end and said second end and along said lower edge, wherein at least one of said outer layer and said inner layer is lined with a first mating side of a hook-and-loop type fastener material and each respective one of said one or more tags is backed with a second mating side of said hook-and-loop fastener material, so that, when said outer layer and said inner layer are pressed together, any of said one or more tags that have been inserted in said central portion between said inner layer and said outer layer with said second mating side placed against said first mating side are fixedly secured between said outer layer and said inner layer of said collar band.

4. The collar of claim 3, wherein said collar band has lines of stitching extending from said lower edge to said upper edge in said central portion of said collar band, and wherein said lines of stitching are spaced apart so as to form a plurality of pockets.

5. The collar of claim 4, wherein said collar band has a collar width dimension between said upper edge and said lower edge that is less than a height dimension of said one or more of said tags, so as to allow said one or more of said tags to project beyond said upper edge of said collar band.

6. The collar of claim 3, wherein at least one tag of said one or more tags is provided with a retainer pin that projects forward toward said outer layer when said at least one tag is placed between said outer layer and said inner layer in a respective viewing section, and wherein a small retainer-pin hole is provided in said outer layer of said collar band such that said retainer pin of said at least one tag is receivable in said retainer-pin hole.

* * * * *